US008958175B1

(12) United States Patent
Lakshmikumaran et al.

(10) Patent No.: US 8,958,175 B1
(45) Date of Patent: Feb. 17, 2015

(54) TAPE HEAD SURFACE WITH NON-UNIFORM CROSS-WIDTH PROFILE

(71) Applicant: Oracle International Corporation, Redwood City, CA (US)

(72) Inventors: Anand V. Lakshmikumaran, Denver, CO (US); Joseph E. Torline, Arvada, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/156,802

(22) Filed: Jan. 16, 2014

(51) Int. Cl.
*G11B 5/187* (2006.01)

(52) U.S. Cl.
USPC .......................................................... 360/122

(58) Field of Classification Search
USPC .......................................................... 360/122
See application file for complete search history.

(56) References Cited

U.S. PATENT DOCUMENTS

| | | | |
|---|---|---|---|
| 4,809,110 A | | 2/1989 | Hertrich |
| 5,519,464 A | | 5/1996 | Brock et al. |
| 5,678,086 A | * | 10/1997 | Gandola et al. ............... 396/319 |
| 5,973,891 A | | 10/1999 | Neumann |
| 6,122,147 A | * | 9/2000 | Fahimi et al. .................. 360/221 |
| 6,151,191 A | | 11/2000 | Muftu et al. |
| 7,199,958 B2 | | 4/2007 | Weber et al. |
| 7,206,167 B2 | * | 4/2007 | Beck et al. ..................... 360/122 |
| 8,054,579 B2 | * | 11/2011 | Biskeborn ...................... 360/122 |
| 8,243,396 B2 | | 8/2012 | Biskeborn et al. |
| 8,254,058 B2 | * | 8/2012 | Biskeborn ...................... 360/122 |
| 8,310,783 B2 | * | 11/2012 | Kawakami et al. ........... 360/122 |
| 8,451,561 B2 | * | 5/2013 | Yano .............................. 360/122 |
| 2008/0037154 A1 | | 2/2008 | Biskeborn et al. |

FOREIGN PATENT DOCUMENTS

| | | |
|---|---|---|
| EP | 0913811 A1 | 5/1999 |
| EP | 0913813 A2 | 5/1999 |

OTHER PUBLICATIONS

A.J. Argumedo et al., "Scaling tape-recording areal densities to 100 Gb/in2," IBM J. Res. & Dev. vol. 52 No. 4/5, Jul./Sep. 2008.
Paul Poorman et al., "Tape Transport Technology," Information Storage Industry Consortium, May 2012.
R.G. Biskeborn, "Flat-Profile Tape Recording Head," IEEEXplore Digital Library, vol. 38, Issue 5, Sep. 2002.

* cited by examiner

*Primary Examiner* — Mark Blouin
(74) *Attorney, Agent, or Firm* — Marsh Fischmann & Breyfogle LLP; Jonathon A. Szumny

(57) ABSTRACT

A tape head having an upper surface with a non-uniform (e.g. non-planar) cross-width (e.g., perpendicular to tape moving over the tape head) profile for eliminating contact between the tape head and portions of the tape not disposed over read/write elements of the tape head (e.g., near opposite first and second edges of the tape) during reading/writing operations on the tape. The upper surface of the tape head includes at least one "active" zone encompassing the read/write elements and that is configured to contact the tape and at least one "inactive" zone that recesses (e.g., slopes, tapers, drops, rounds, etc.) away from the active zone to avoid contact with tape traveling thereover. Eliminating contact between the tape head and portions of the tape not currently being read and/or written reduces friction between the tape and the tape head and facilitates control of tape head lateral positioning, tape tension, and tape speed.

20 Claims, 9 Drawing Sheets

TAPE HEAD SURFACE WITH NON-UNIFORM CROSS-WIDTH PROFILE

BACKGROUND

1. Field of the Invention

The present invention generally relates to the storing of data on magnetic tape media and, more particularly, to tape heads for writing data to and reading data from magnetic tape media.

2. Relevant Background

The market for mass storage devices is growing at an ever increasing rate with the sales of high-performance computers penetrating numerous industries ranging from financial institutions to oil exploration companies. The processing power of these high-performance systems, and the data they generate, are increasing faster than the ability of storage devices to keep pace. The problem of data storage and rapid retrieval is particularly pronounced in computational-intensive applications which create huge amounts of data that need to be accessed in seconds rather than minutes, hours or even days.

Magnetic disks remain the preferred media for direct access to frequently used files because of their fast access times. However, because of their high cost per-unit of storage and limited capacity, magnetic disk recorders are prohibitively expensive and therefore impractical for large-scale data storage. With the advances in magnetic tape technology, tape based systems remain the preferred choice for mass data storage. In addition to cost, magnetic tape exceeds the storage density of almost any other medium, at least from a volumetric standpoint, because tape is a much thinner medium than, for example, magnetic disks, and tape can be tightly packed.

Magnetic tape (e.g., recording tape) is a magnetic recording medium made of a thin magnetizable coating on a long, narrow strip of plastic which is typically stored in the form of a spool on a cartridge or cassette. Typically, multiple, parallel data tracks may be written to and/or read data from the tape in one of a number of manners. In "linear" or "longitudinal" reading or recording, data is read or recorded by one or more tape heads (e.g., each including one or more tape head modules that each have a plurality of read or write elements such as 16, 32, etc.) of a tape drive or recording device by moving the tape relative to the tape head(s) from a starting point on the first track of the tape and moving linearly down the tape along the first track or along a first path. Once the physical end of the tape (EOT) is reached, the tape is rewound to the beginning of the tape (BOT) at which point each tape head begins reading or recording linearly down the tape along the second track or along a second path. Variations of the linear method include "serpentine" and "spiral in" reading and recording. One or more tracks written at the same time along the tape length may be referred to as a "wrap." In this regard, a new wrap begins each time the head assembly begins reading or writing in the forward or reverse directions. Often, magnetic tape is pre-formatted with a plurality of guards (i.e., strips of the tape on which user data cannot be written) running either perpendicular to the tape length (to separate the tape into a number of sections or segments) or along the tape length (to separate the tape into a number of servo portions or data bands on which independent read/write heads can operate).

SUMMARY

Lower tape head/tape spacing (e.g., between the read/write elements and the magnetic layer(s) of the tape) can lead to damage to the tape while increased tape head/tape spacing can lead to performance degradation (e.g., magnetic spacing loss). In this regard, the profile of the upper bearing surface of the tape head may sometimes be tapered, radiused, curved, blended, and/or the like in the direction of tape motion (i.e., along a sectional cut through the tape head parallel to the direction or course of tape motion) in an effort to maintain a delicate balance between tape head/tape spacing and contact pressure. In the case of a tape head having two or more separate modules (e.g., where each module includes an independent set or span of read and/or write elements), for example, the bearing surfaces of the modules may be appropriately individually contoured in the direction of tape motion to impart a particular overall contour to the tape head in the direction of tape motion that results in more gradual levels of contact between the tape and tape head as the tape moves onto the tape head in first and second opposite directions.

For purposes of achieving higher linear recording densities and supporting increases in tape cartridge storage capacity, recording tapes have, over time, been designed to become smoother (e.g., reduced surface roughness) which reduces the spacing between the magnetic coating(s) or layer(s) on the tape and the recording devices (e.g., read/write elements) on the head. However, reductions in spacing between the magnetic coating/layer on the tape and the recording devices on the head can result in increases in friction between the moving tape and the stationary head and thus create complications with the precise control of the lateral position of the head relative to the recording tape (e.g., with servo positioning), tape tension, and tape speed. Increased track densities on the tape, reduced nominal tape tension (e.g., due to the use of thinner tapes), and increased tape speeds have further exacerbated the requirements on lateral head position and tape motion control.

Generally, the string (e.g., set) of read and/or write elements on the surface of a tape head spans less than the entire cross-width of the tape head (i.e., the width of the tape head in a direction perpendicular to the direction or course of tape motion). As the length of the span of read/write elements is typically or may be only a fraction of the width of the tape (e.g., ¼, ⅛, 1/16, etc.), the tape need not necessarily contact the tape head across the entire width of the tape. However, existing tape heads and tape head modules include uniform profiles in their cross-width dimensions. That is, the shape or outline of the upper surface of existing tape heads and tape head modules generally remains constant along a line between opposite edges of the tape heads/tape head modules that is parallel to their cross-width dimensions.

In this regard, the inventor has determined that the cross-width profile of the tape head (e.g., or of at least one module thereof) may be appropriately configured to eliminate contact between the tape head and one or more portions of the tape along the width of the tape that are not disposed over the read/write elements of the tape head. Eliminating contact between the tape head and portions of the tape not currently being read and/or written reduces the aforementioned increases in friction owing to use of smoother magnetic tape as well as the complications with lateral positioning control, tape tension, and tape speed that may otherwise be associated with such increases in friction. Furthermore, the use of thinner tapes at higher linear recording densities and higher track densities may be facilitated, thus increasing tape cartridge capacities and data transfer rates. In addition to appropriately configuring the cross-width profile, the width profile (e.g., parallel to the course of tape motion) may be appropriately contoured as discussed above (e.g., such as for purposes of maintain an appropriate balance between tape head/tape spacing and contact pressure.

Broadly, a non-uniform (e.g. non-planar) cross-width profile may be applied to or generated on the surface of the tape head (e.g., in any appropriate manner such as by machining, cutting, etc.) that serves to eliminate contact between the tape head and portions of the tape along the width of the tape not disposed over the read/write elements of the tape head (e.g., near opposite first and second lateral edges of the tape) during reading/writing options on the tape. More specifically, the upper surface of the tape head may include at least one "active" zone encompassing the span of read and/or write elements and having a cross-width profile that is configured to be substantially parallel to a portion of the tape traveling therepast for facilitating accurate contact/near contact between the read/write elements of the tape head and the tape (e.g., where the active zone includes a bearing surface of the tape head). The upper surface of the tape head may also include at least one "inactive" zone, such as first and second inactive zones adjacent or near first and second opposite ends of the tape head having cross-width profiles that are respectively configured to slope, recess, taper, drop, round, etc. away from the active zone to avoid (e.g., be free of) contact with tape traveling thereover.

Configuring the first and second inactive zones to slope, recess, taper, drop, round, etc. away from the active zone in the tape head cross-width direction allows the active zone to protrude into the tape path and thus maintain contact or near contact between the read/write elements and the tape. The width of the active zone (i.e., in the tape head cross-width direction) may be anywhere from substantially equal to or slightly wider than the span of the read/write elements up to the full width of tape. The upper surface of the tape head may also include at least one "transition" zone between the active zone and each inactive zone that may or may not make contact with the tape. In one arrangement, each transition zone may be configured to have a non-planar (e.g., curved) profile to limit damage to the tape that may otherwise occur due to sharp edges and the like.

In one aspect, a tape head module for performing at least one of reading operations and writing operations on a magnetic tape includes a body and an upper surface on the body that is configured to face a magnetic tape traveling at least partially along a first reference axis over the upper surface. The upper surface includes a first region (e.g., first "zone") that encompasses (e.g., includes) a plurality of at least one of read elements and write elements that are respectively configured to read data from and write data to the tape as the magnetic tape travels over and at least partially in contact with the first region. The upper surface also includes a second region (e.g., second "zone") configured to be free of contact with the magnetic tape as the magnetic tape travels over the second region. A distance between a) a second reference axis perpendicular to the first reference axis and b) the second region increases in a direction away from the first reference axis.

In another aspect, a tape head module for performing at least one of reading operations and writing operations on a magnetic tape includes a body and an upper surface on the body that includes a plurality of at least one of reading elements and writing elements that are respectively configured to read data from and write data to a magnetic tape. The upper surface tapers in first and second opposite directions away from the plurality of read and/or write elements and in third and fourth opposite directions away from the plurality of read and/or write elements, and where the first and second directions are perpendicular to the third and fourth directions.

In a further aspect, a method of operating a tape drive includes moving tape over a plurality of at least one of reading elements and writing elements of a tape head of a tape drive so that a first portion of the tape along a reference line perpendicular to the first and second opposite edges of the tape is in contact with the tape head and a second portion of the tape along the reference line is spaced from the tape head.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 2b is a sectional view of the plan view of FIG. 2a.

FIG. 3b is a sectional view of the plan view of FIG. 3a.

FIG. 4b is a side view of the tape head module of FIG. 4a.

FIG. 4c is a sectional of another embodiment of the tape head module FIG. 4a.

FIG. 5b is a side view of the tape head module of FIG. 5a

FIG. 5c is a sectional end view of the tape head module of FIG. 5a.

DETAILED DESCRIPTION

Disclosed herein are utilities for eliminating contact between a tape head of a tape drive and one or more portions of a tape (e.g., magnetic) along the width of the tape that are not disposed over the read/write elements of the tape head for reducing friction between the tape and tape head during read/write operations and facilitates control of tape head lateral positioning, tape tension, tape speed, and the like. Stated differently, the disclosed utilities maintain contact (or near contact) between a) portions of a tape moving directly over the read/write elements and b) the tape head while simultaneously space portions of the tape not directly over the read/write elements from the tape head, such as one or more lateral portions of the tape (e.g., where the lateral portions of the tape are disposed on a reference line that is perpendicular to first and second opposite edges of the tape and that passes through the portions of the tape moving directly over the read/write elements). For instance, an upper surface of a tape head (e.g., or a tape head module of a tape head) may include at least one "active" zone encompassing the read/write elements and that is configured to contact the tape, and at least one "inactive" zone that recesses (e.g., slopes, tapers, drops, rounds, etc.) away from the active zone to avoid contact with tape traveling thereover.

Figure 1:
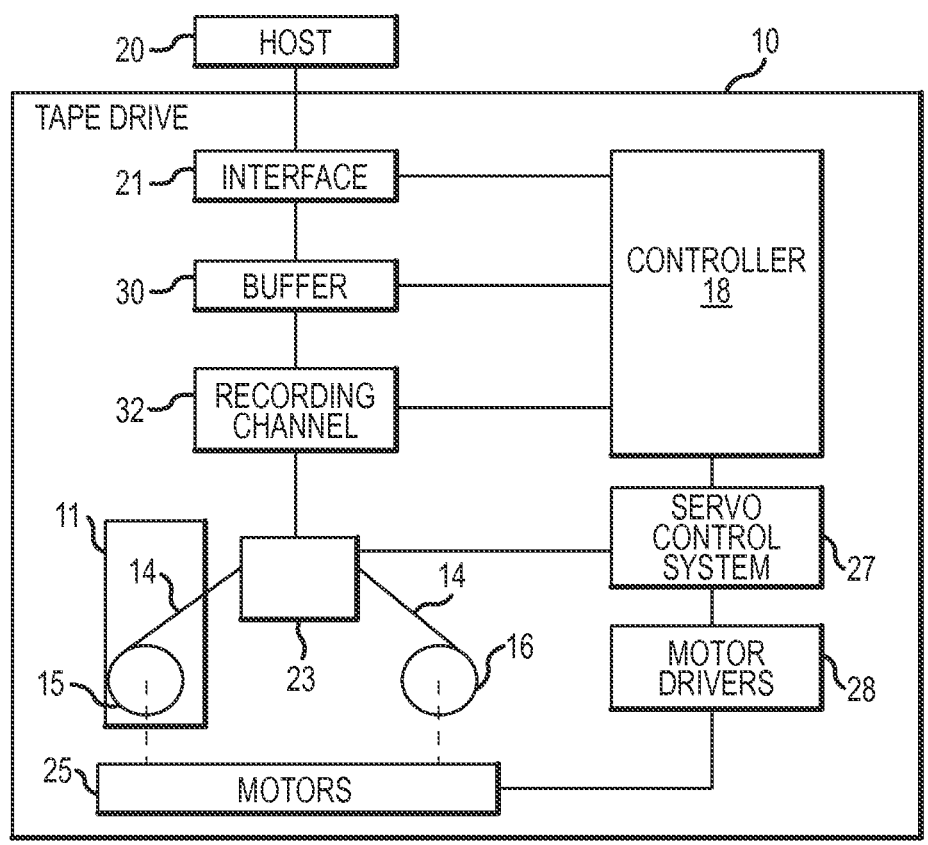
FIG. 1 is a schematic view of an exemplary tape drive that may be adapted to implement the various utilities (e.g., apparatuses, methods, and/or the like) disclosed herein.

Before discussing the disclosed utilities (including the disclosed tape head that is configured to reduce friction between the tape head and a tape traveling thereover), reference is initially made FIG. 1 which presents a schematic view of an exemplary tape drive 10 and a magnetic tape cartridge 11 that may be adapted to implement the various utilities disclosed herein (although it is to be understood that numerous other forms of tape drives may be used to implement the disclosed utilities, such as single reel tape drives, dual reel cartridges, and the like). The magnetic tape cartridge 11 in FIG. 1 includes a length of magnetic tape 14 (e.g., magnetic tape pack, magnetic tape media) wound on at least one reel 15. The tape drive 10 may include one or more controllers 18 of a recording system for operating the tape drive 10 in accordance with commands received from a host system 20 received at an interface 21. The tape drive 10 may be coupled to the host system 20 in a number of manners such as directly, through a library, or over a network (e.g., via Small Computer Systems Interface (SCSI), Fibre Channel Interface, and the like). The tape drive 10 may be a standalone unit or form part of a tape library or other subsystem.

The magnetic tape cartridge 11 may be inserted into the tape drive 10 and loaded by the tape drive 10 so that the tape 14 winds around a reel 16 of the tape drive 10 and so that at least one tape head assembly 23 of the recording system (e.g., each including one or more tape heads, tape guides, or the like) reads and/or writes information with respect to the tape 14 as the tape 14 is moved longitudinally in first/forward and/or second/reverse opposed directions past the tape head assembly 23 along a course by one or more motors 25. For instance, each tape head may include one or more tape head modules, where each module includes a plurality of read elements, write elements, and/or servo elements for use in respectively reading data from the tape 14, writing data to the tape 14, and maintaining precise control of the tape head assembly 23 with respect to the tape 14.

The tape 14 may include a plurality of parallel data tracks that may be read and/or written by the at least one tape head of the tape head assembly 23. In some formats, the tracks may be written and/or read in a serpentine, back and forth manner; in a spiral-in manner; and the like. The recording system may include a servo control or tracking system 27 to electronically switch from one tape head to another tape head assembly 23; to seek and move a tape head assembly 23 laterally relative to the tape 14 (e.g., perpendicular to a direction of movement or course of the tape 14); to position the a tape head at a desired location over the tape 14 and/or one or more tracks of the tape 14; to follow one or more desired tracks; and/or the like. The servo control system 27 may also control the operation of the motors 25 through motor drivers 28 in response to instructions by the one or more controllers 18, where the controllers 18 may provide the data flow and formatting of data to be read from and written to the magnetic tape 14 (e.g., via employing a buffer 30 and a recording channel 32). The various components of the tape drive 10 may be incorporated or otherwise embodied within any appropriate housing (not shown).

Figure 2A:
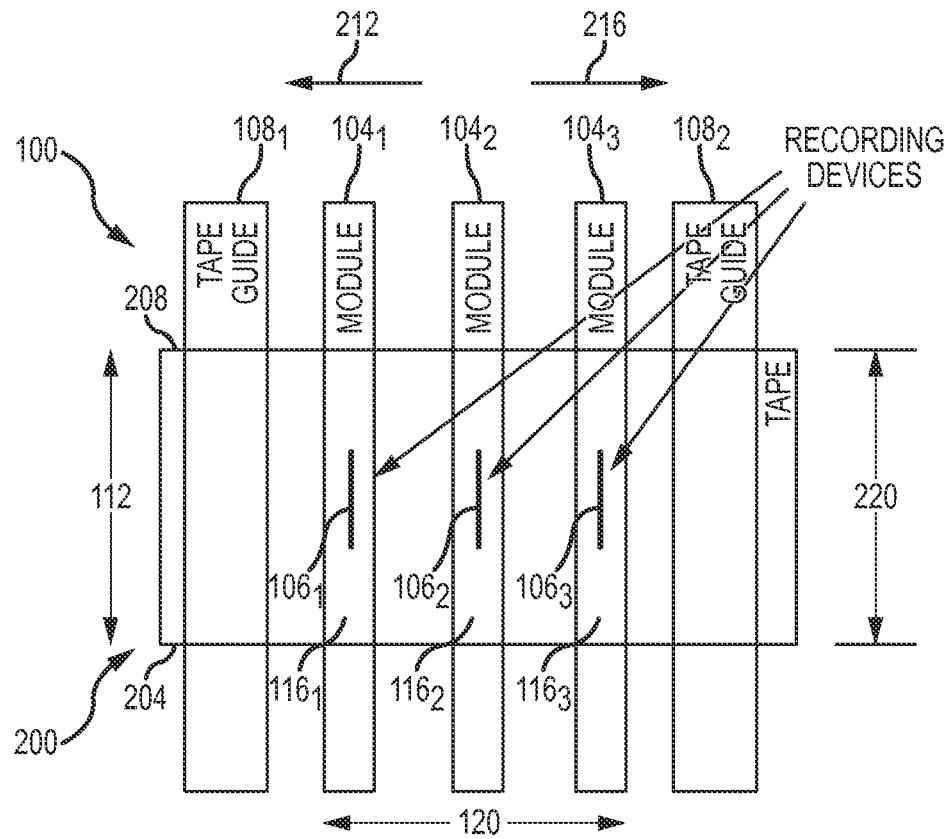
FIG. 2a is a simplified schematic plan view of a tape head of a tape drive.
Figure 2B:
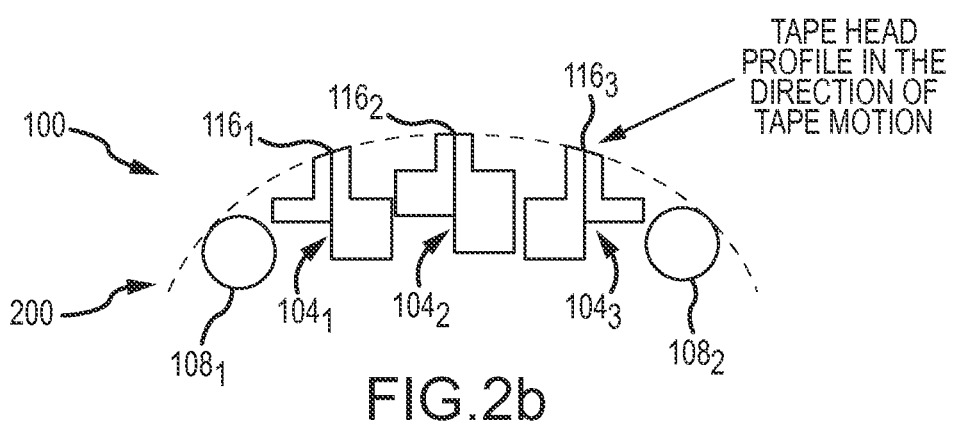

FIGS. 2a and 2b present respective plan and sectional schematic views of a tape head 100 (e.g., part of tape head assembly 23 of FIG. 1) for use in writing data to and/or reading data from a length of magnetic tape 200 operable to move in opposite first and second directions 212, 216 along a course or path according to one embodiment. Broadly, the tape head 100 may include at least one tape head module 104 such as first, second and third tape head modules $104_1$, $104_2$, $104_3$ that each include a plurality (e.g., span, such as 16, 32, etc.) of elements (e.g., read, write, and/or servo read transducers) 106 such as first, second and third sets $106_1$, $106_2$, $106_3$ of elements on upper surfaces $116_1$, $116_2$, $116_3$ thereof. As just one example, the first and third sets $106_1$, $106_3$ may include write elements while the second set $106_2$ may include read elements. In this regard, data may be written to tape 200 by the third set $106_3$ of write elements of the third tape head module $104_3$ and then read by the second set $106_2$ of read elements of the second tape head module $104_2$ when the tape is moved in the first direction 212 (e.g., by controller 18, servo control system 27, motor drivers 28, etc. of tape drive 10 of FIG. 1) and may be written to tape 200 by the first set $106_1$ of write elements of the first tape head module $104_1$ and then read by the second set $106_2$ of read elements of the second tape head module $104_2$ when the tape is moved in the second direction 216. Of course, other arrangements of the first, second and third sets $106_1$, $106_2$, $106_3$ of elements are also envisioned and encompassed herein.

Each set 106 of elements may be appropriately disposed on a "bump" of the respective tape head module 104 and may include one or more servo read elements (not shown) that are configured to read corresponding servo patterns (not shown) on the surface of the tape 200. Any appropriate servo control system (e.g., servo control system 27 of FIG. 1) may utilize information received from the servo read elements as the servo read elements are reading the servo patterns for purposes of maintaining alignment of the read and write elements over desired locations or positions on the tape 200. In addition to one or more tape head modules 104, the tape head 100 may also include one or more tape guides 108 (e.g., outriggers, etc.) such as first and second tape guides $108_1$, $108_2$ over which the tape 200 is configured to pass for purposes of supporting the entire width of the tape 200 and presenting the tape 200 to the tape head modules 104 with an appropriate contact angle for maintaining appropriate contact pressure between the tape 200 and the tape head modules 104, and the like.

Figure 3A:
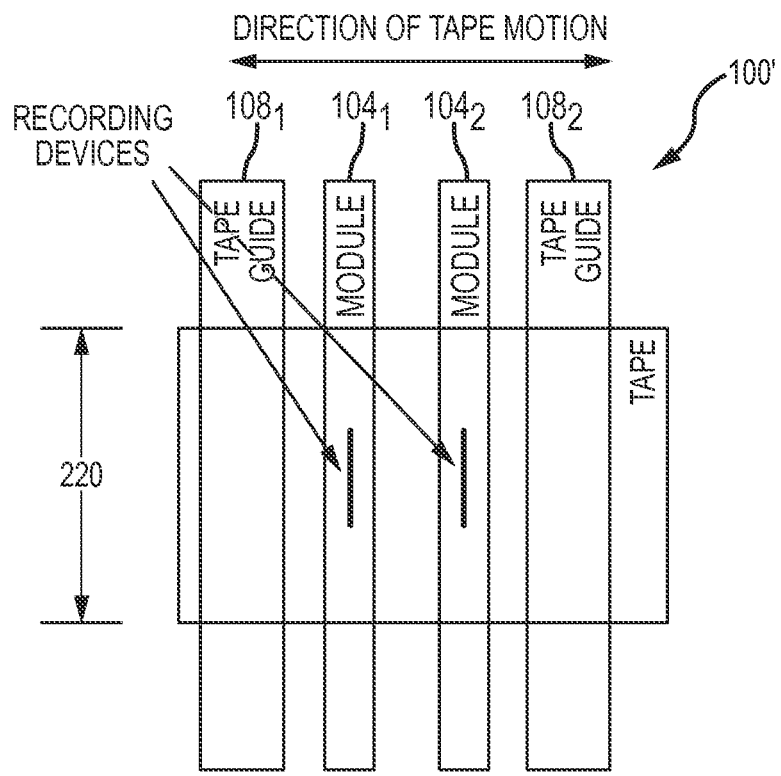
FIG. 3a is a simplified schematic plan view of another tape head of a tape drive.
Figure 3B:
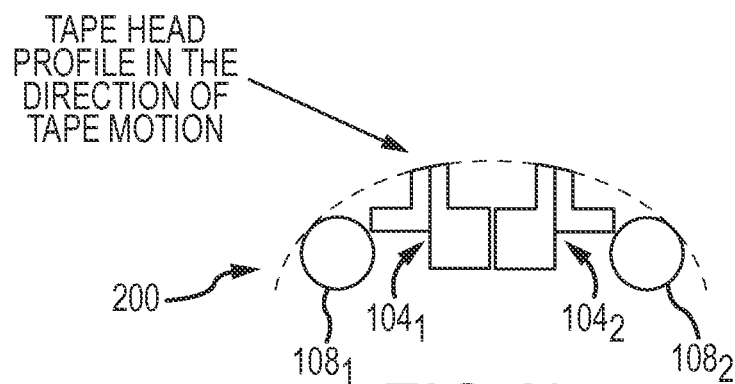

While a tape head 100 having three tape head modules $104_1$, $104_2$, $104_3$ has been shown in FIGS. 2a and 2b, tape heads having other numbers (e.g., fewer, greater) of tape head modules are also envisioned and encompassed herein. For instance, FIGS. 3a and 3b present respective plan and sectional schematic views of a tape head 100' according to another embodiment that includes only first and second tape head modules $104_1$, $104_2$. Furthermore, numerous additional components of the tape heads 100/100' have been omitted from the drawings and this discussion in the interest of clarity.

In one arrangement, one or more of the upper surfaces $116_1$, $116_2$, $116_3$ of the tape head modules $104_1$, $104_2$, $104_3$ may be appropriately shaped or configured in the width direction 120 of the tape head modules $104_1$, $104_2$, $104_3$ (e.g., along the first and second directions of movement 212, 216 of the tape 200) and/or the tape guides $108_1$, $108_2$ and the tape head modules $104_1$, $104_2$, $104_3$ may be appropriately positioned to impart an overall curved contour to the tape head 100 in the direction of tape motion that results in more gradual levels of contact between the tape 200 and tape head 100 as the tape 200 moves onto the tape head 100. See FIG. 2b. This arrangement limits increased contact pressure between the tape head 100 and the tape 200 that may otherwise lead to tape damage while maintaining appropriate tape head/tape spacing (e.g., between the read/write elements and the magnetic layer(s) of the tape) to limit performance degradation (e.g., magnetic spacing loss).

For instance, the first and second opposite edges (e.g., perpendicular to the width direction 120) of the upper surface $116_2$ of the second tape head module $104_2$ may be appropriately contoured (e.g., tapered, radiused, curved, blended, sloped, etc.) along the direction of tape motion and width direction 120 in an effort to maintain a delicate balance between tape head/tape spacing and contact pressure. As another example, the upper surface $116_3$ of the third tape head module $104_3$ may be appropriately shaped or configured so that tape 200 exits a second edge of the upper surface $116_3$ at a level higher than when the tape first contacted an opposite first edge of the upper surface $116_3$ in the first direction 212. This arrangement advantageously allows the tape 200 to follow the curved contour as the tape 200 moves between the third tape head module $104_3$ and the second tape head module $104_2$ and between the third tape head module $104_3$ and the second tape guide $108_2$.

As discussed previously, magnetic tape has generally become smoother over time for purposes of achieving higher linear recording densities and supporting increases in tape cartridge storage capacity. However, the reductions in spacing between the magnetic coating/layer on the tape and the recording devices on the head owing to such increases in smoothness results in increases in friction between the moving tape and the tape head and creates complications with the precise control of the lateral position of the head relative to the recording tape (e.g., with servo positioning), tape tension, and tape speed, among other inefficiencies. The aforementioned friction increases can become more pronounced with existing tape heads as they are generally configured so that moving tape contacts the tape heads across substantially the entire width of the tape.

Figure 4A:
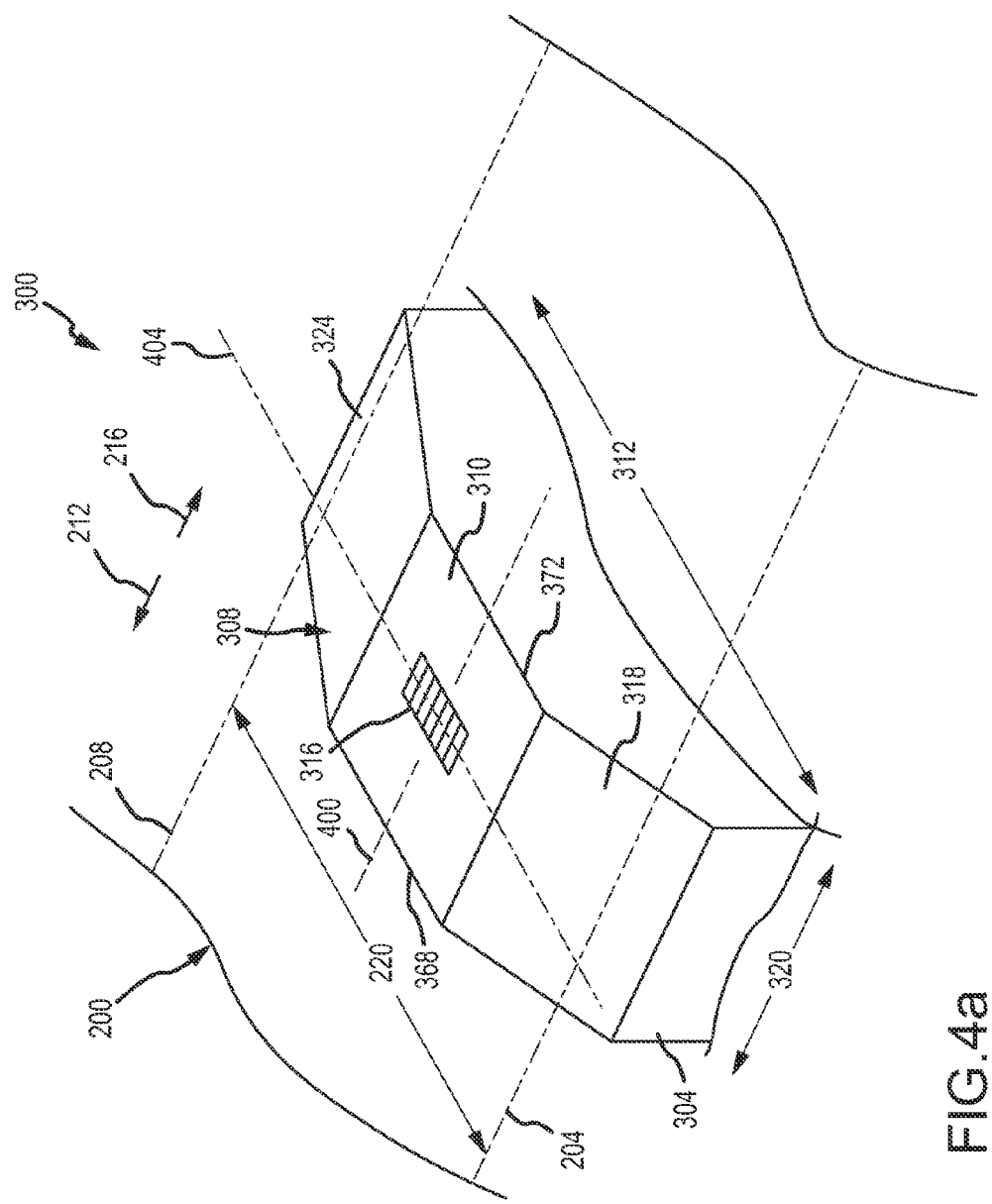
FIG. 4a is a perspective view of a tape head module disclosed herein according to one embodiment.
Figure 4B:
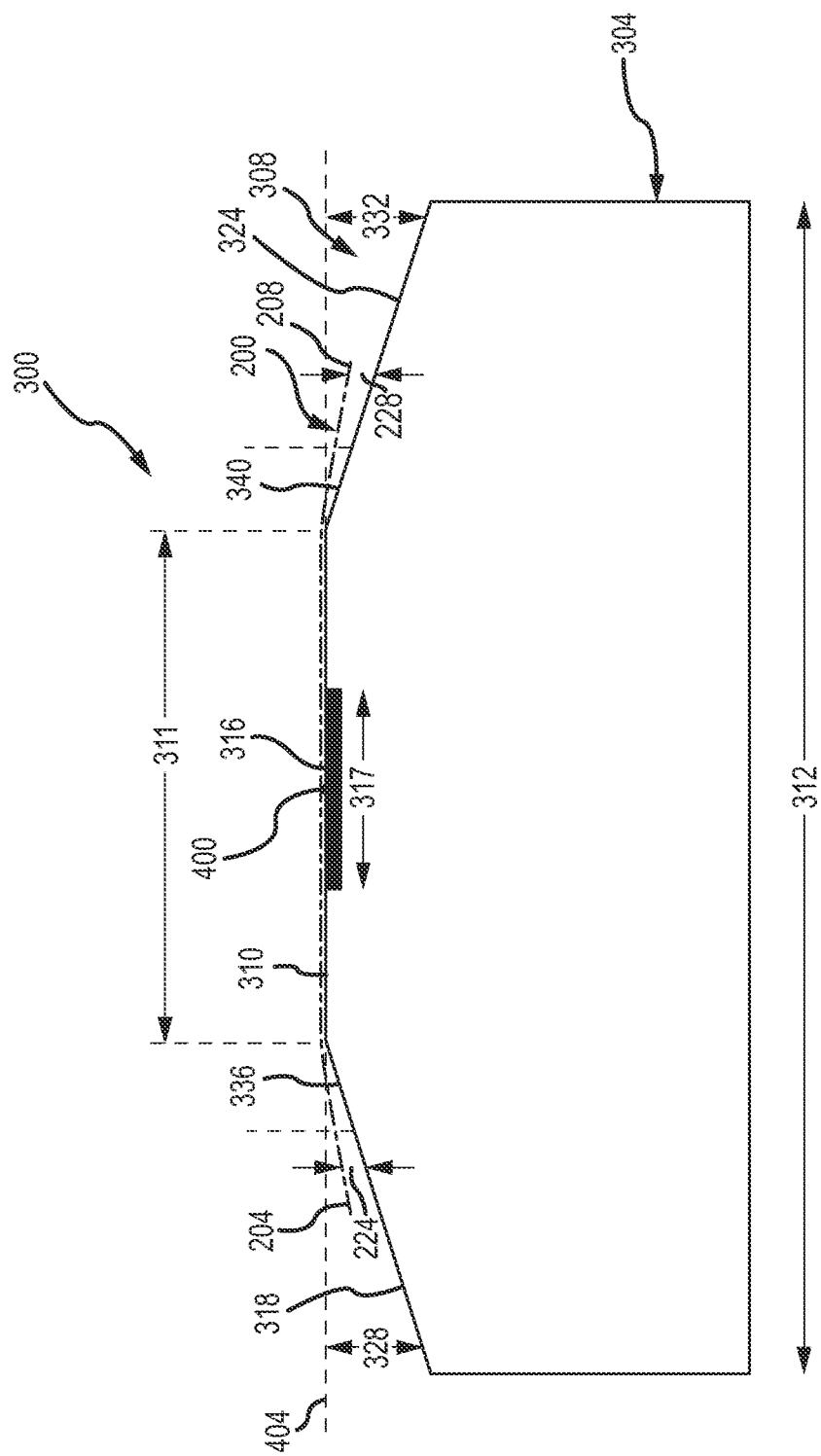

Turning now to FIGS. 4a and 4b, perspective and side views of a portion of a tape head module 300 (e.g., one of tape head modules 104 of FIGS. 2a and 2b) of a tape head are illustrated that is configured to eliminate some of the contact between the tape head module 300 and tape 200 moving thereover for purposes of limiting the aforementioned friction increases and thus facilitating control of tape lateral positioning, tape tension, tape speed, and the like. Broadly, the tape head module 300 includes a body 304 which may be appropriately mechanically and electrically interconnected to a tape drive (e.g., tape drive 10 of FIG. 1) and an upper surface 308 on the body 304 that is configured to face the magnetic tape 200 traveling at least partially along a first reference axis 400 over the upper surface 308.

More specifically, the upper surface 308 includes a first region 310 (e.g., an active zone) that encompasses a plurality of elements 316 (e.g., a span or set of read and/or write elements) that are respectively configured to read data from and/or write data to the tape 200 moving thereover in one of first and second opposite directions 212, 216 that are parallel to or at least partially collinear with the first reference axis 400. For instance, the set of elements 316 may be generally arranged along a second reference axis 404 that is perpendicular to the first reference axis 400 such that the set of elements 316 generally extends across a portion of the cross-width 312 of the tape head module 300 and thus a width 220 of the tape 200. In one arrangement, the width 311 of the first region 310 (along the cross-width 312 of the tape head module 300) may be at least as great as the width 317 of the set of elements 316 (along the cross-width 312 of the tape head module 300). See FIG. 4b. In another arrangement, the width 311 of the first region 310 may be no greater than the width 220 of the tape 200. Furthermore, the first region 310 may have a substantially constant profile along the cross-width 312 of the tape head module 300. That is, the contour or profile of the first region 310 may be substantially constant along the second reference axis 404 as well as along axes parallel to the second reference axis 404 (e.g., so that the set of elements 316 can make appropriate contact with the surface of the tape 200 moving thereover).

The upper surface 308 may also include at least one additional region (e.g., inactive zone), such as second and third regions 318, 324, recessed away from the first region 310 to eliminate or at least limit contact between the tape 200 and the additional region(s) as the tape 200 moves over the upper surface 308 in one of the first and second directions 212, 216 along the first reference axis 400. More specifically, a distance 328 between the second reference axis 404 and the second region 318 increases in a direction away from the first reference axis 400, such as in a first direction that is substantially perpendicular to the first reference axis 400 and parallel to the second reference axis 404. Similarly, a distance 332 between the second reference axis 404 and the third region 324 increases in a direction away from the first reference axis 400, such as in a second direction that is substantially perpendicular to the first reference axis 400 and parallel to the second reference axis 404 that is opposite to the first direction. Stated differently, each of the second and third regions 318, 324 recesses (e.g., tapers, curves, slopes, falls, etc.) away from the first region 310 and the set of elements 316 along the cross-width 312 of the tape head module 300 (e.g., where the cross-width 312 is perpendicular to a width 320 of the tape head module 300).

This arrangement results in a non-uniform profile of the upper surface 308 along the cross-width 312 of the tape head module 300 such that the first region 310 (within which the set of elements 316 are encompassed) protrudes into the tape path and contacts the tape 200 whereas at least some of the second and third regions 318, 324 do not protrude into the tape path and thus do not contact the tape 200 (i.e., those portions of the tape 200 not currently being read and/or written by the set of elements 316). See respective spaces 224, 228 (e.g. gaps) between the second and third regions 318, 324 and the tape 200, such as starting near first and second opposite edges 204, 208 of the tape 200 and continuing towards, but not necessarily to, the first region 310. It is noted that the slight gap between the tape 200 and first region 310 of the tape head module 300 has been provided in the interest of clarity and that the tape 200 may in actuality be in direct contact with the first region 310, such as at least the portion of the first region 310 that includes the set of elements 316. In one arrangement, the total of the second and third regions 318, 324 may include at least about 65% of the total cross-width 312 of the tape head module 300. In any case, the resulting spaces 224, 228 due to the recessed second and third regions 318, 324 results in a reduction in friction between the tape head module 300 and the tape 200 during reading and writing operations on the tape 200 and a corresponding improvement in control of lateral positioning, tape speed, and the like.

With reference to FIG. 4b, the upper surface 308 of the tape head module 300 may also include a first "transition" region 336 that may allow for a gradual reduction in contact with the tape along the cross-width 312 of the tape head module 300 between the first region 310 and second region 318 and a second "transition" region 340 that may allow for a gradual reduction in contact with the tape along the cross-width 312 of the tape head module 300 between the first region 310 and the third region 324. Like the second and third regions 318, 324, the first and second transition regions 336, 340 may recess away from the first region 310 in opposite first and second directions towards the second and third regions 318, 324, respectively (e.g., such that a distance between the second reference axis 404 and the first and second transition regions 336, 340 increases in a direction away from the first reference axis 400). The first and second transition regions 336, 340 may be portions of the second and third regions 318, 324 or may be distinct regions. Provision of the first and second transition regions 336, 340 avoids or limits damage to the tape 300 and/or difficulties with control of lateral positioning, tape speed, etc. that may otherwise occur in the event of a sharp profile change from the first region 310 to the second and third regions 318, 324.

In one arrangement, the profile of one or both of the second and third regions 318, 324 (and first and second transition regions 336, 340) along the cross-width 312 of the tape head module 300 may include a constant slope away from the first region 310 (in first and second directions away from the first reference axis 400) as shown in FIG. 4b, such as a slope of not greater than 25 degrees, or more particularly not greater than about 20 degrees (e.g., as measured between the second reference axis 404 and each of the second and third regions 318, 324, see FIG. 4b). For instance, each of the first, second and third regions 310, 318, 324 may reside entirely or primarily in a respective single plane.

Figure 4C:
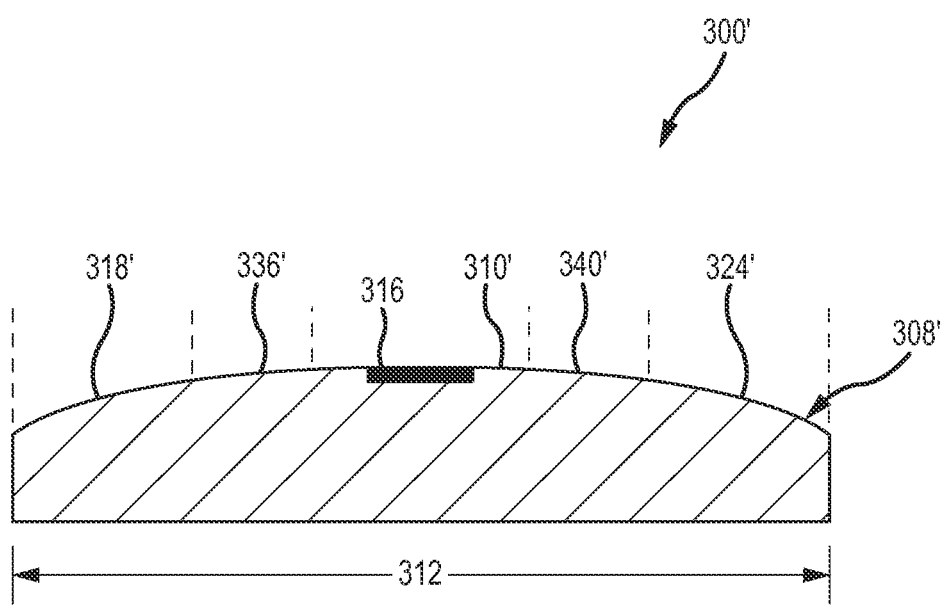

In another arrangement, and as shown in sectional view of the embodiment of the tape head module 300' of FIG. 4c, the second and third regions 318', 324' (and first and second transition regions 336', 340') may have a "bowed" profile along the cross-width 312 and thus may include one or more particular radii of curvature away from the first region 310 (in first and second directions away from the first reference axis 400). For instance, the first and second transition regions 336', 340' may have a common first radius of curvature and the second and third regions 318', 324' may have a common second radius of curvature (e.g., greater than about 5 mm) that is smaller than the first radius of curvature. Alternatively, the first transition region 336' and second region 318' may have a common radius of curvature and the second transition region 340' and the third region 324' may have a common radius of curvature the same as that of the first transition region 336' and second region 324'. Numerous other ranges of radii of curvature are also envisioned and included within the scope of the present disclosure.

In addition to appropriately shaping or configuring (e.g., tapering, recessing, etc) the upper surface 308 of the tape head module 300 in opposite directions away from the first region 310 as discussed above, the upper surface 308 may, in some embodiments, also be appropriately shaped or configured to taper, recess, etc. (e.g., such as with one or more particular radii of curvature, slopes, etc.) in opposite directions away from the second reference axis 404 along the width 320 of the tape head module 300 (i.e., along the first and second directions 212, 216 of motion of the tape 200 over the upper surface 308) for purposes of maintaining a balance between a) contact pressure between the tape head module 300 and the tape 200 as the tape 200 is moving over the upper surface 308 in the first and second directions 212, 216 and b) spacing between the set of elements 316 of the tape head module 300 and the magnetic layer(s) of the tape 200 as discussed previously in relation to FIG. 2b.

Figure 5A:
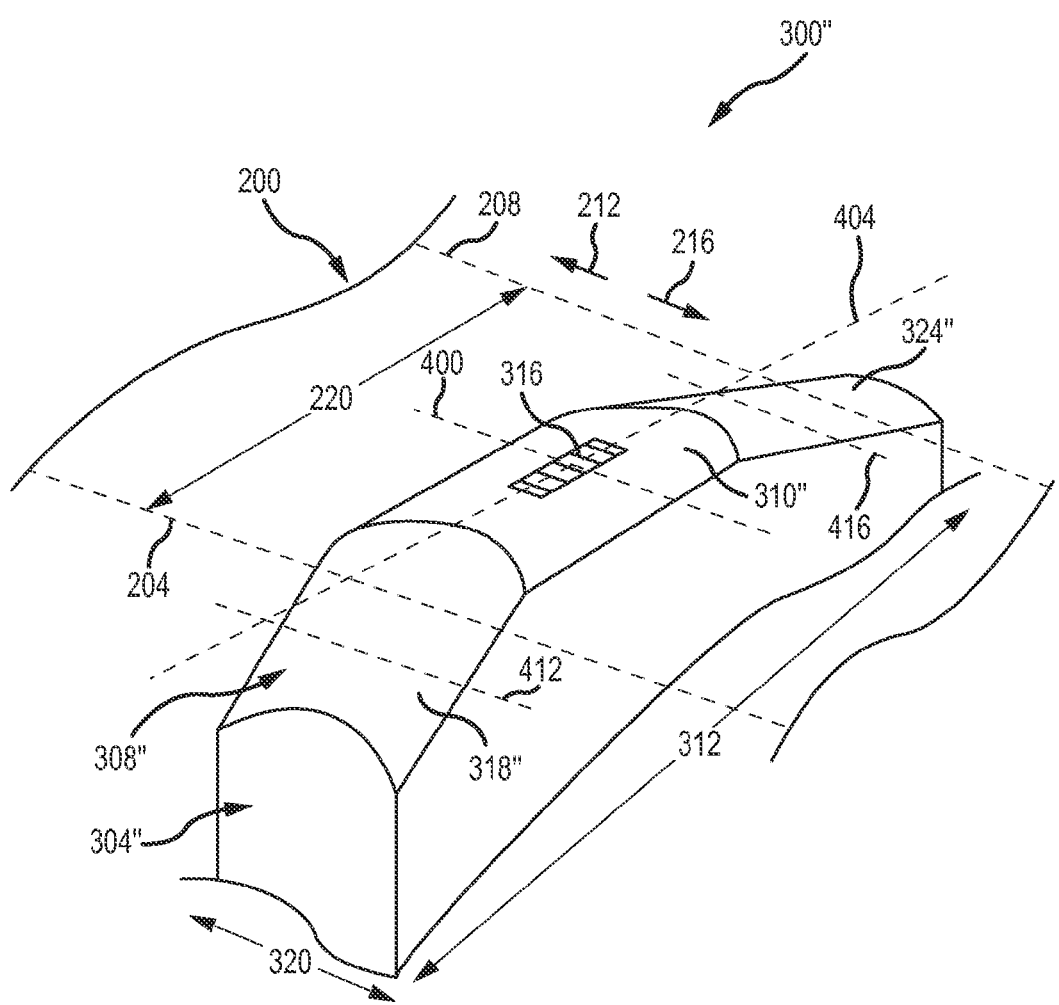
FIG. 5a is a perspective view of another embodiment of a tape head module disclosed herein.
Figure 5B:
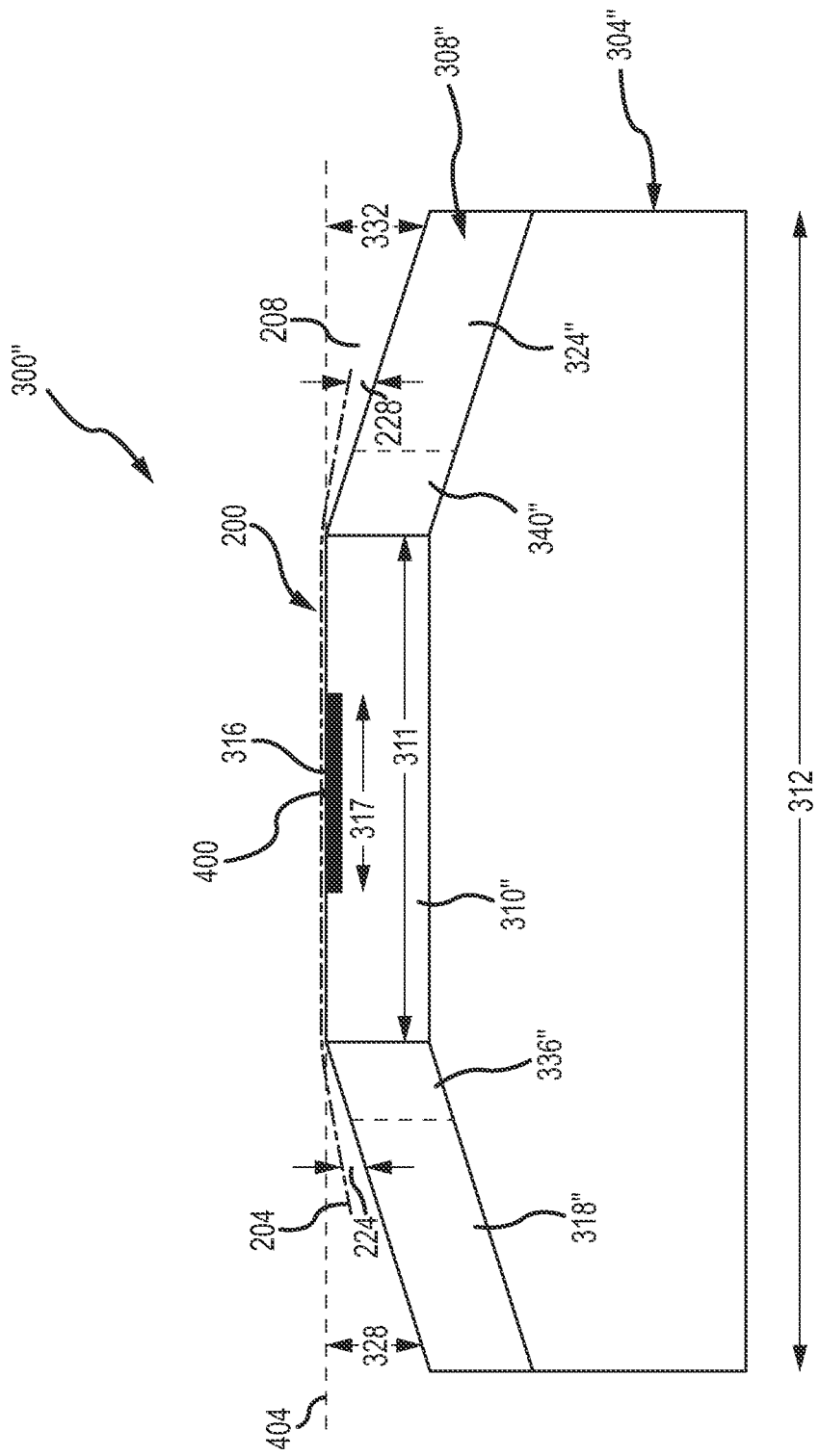
Figure 5C:
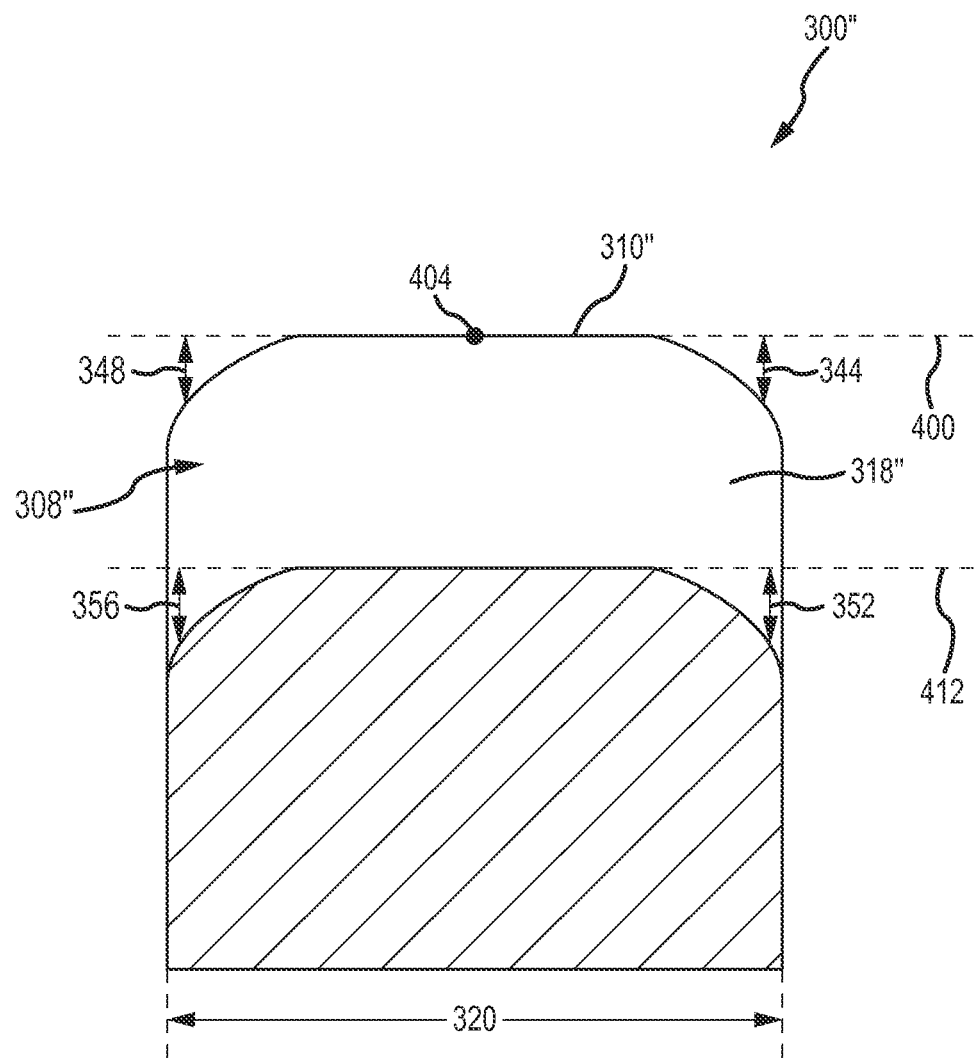

Turning now to the embodiment of the tape head module 300" of FIGS. 5a-5c, a distance 344 between the first reference axis 400 and the first region 310" may increase in a first direction away from the second reference axis 404 and a distance 348 between the first reference axis 400 and the first region 310" may increase in an opposite second direction away from the second reference axis 404. In this example, at least a portion of the first region 310" along the first and second reference axes 400, 404 (e.g., that includes the set of elements 316) may still reside in a single plane. As another example, a distance 352 between a) a third reference axis 412 through a top of the second region 318" and that is parallel to the first reference axis 400 and b) the second region 318" may increase in a first direction away from the second reference axis 404 and a distance 356 between a) the third reference axis 412 and b) the second region 318" may increase in an opposite second direction away from the second reference axis 404. Similarly, a distance (not shown, but similar to that in FIG. 5c) between a) a fourth reference axis 416 (not shown, but similar to third reference axis 412 in FIG. 5c) through a top of the third region 324" and that is parallel to the first reference axis 400 and b) the third region 324" may increase in a first direction away from the second reference axis 404 and a distance (not shown) between a) the fourth reference axis and b) the third region 324" may increase in an opposite second direction away from the second reference axis 404. As an alternative or in addition to the first and second regions 318", 324", the first and second transition regions 336", 340" may recess in first and second opposite directions away from the second reference axis 404 along the width 320 of the tape head module 300.

In use, the tape 200 may be moved over the set of elements 316 of the tape head module 300 so that a first portion of the tape 200 is in contact with the tape head (e.g., such as a first portion of the tape 200 above set of elements 316 in FIG. 4b) and a second portion of the tape 200 (e.g., such as second and/or third portions of the tape 200 adjacent or near first and second opposite lateral edges 204, 208 of the tape 200) disposed along a reference line perpendicular to the first and second edges of the tape (e.g., a reference line disposed along the broken line representing the tape 200 in FIG. 4b) and that passes through the first portion of the 200 is spaced from the tape head module 300 (e.g., spaced from second and third regions 318, 324 of the tape head module 300 by gaps 224, 228). For instance, at least about 20% may be spaced from the tape head module 300 as the tape 200 is moved over the upper surface 308 of the tape head module 300. Reductions in friction between the tape 200 and tape head module 300 result from spacing portions of the tape 200 from the tape head module 300 as discussed herein.

As discussed herein, the second and third regions 318, 324 may be recessed away from the first region 310 of the upper surface 308 of the tape head module 300 so that the first region 310 protrudes into the tape path to facilitate appropriate contact between the first region 310 and the tape 200. In one arrangement, at least the portion of the first region 310 that encompasses the set of elements 316 may reside in a single plane (e.g., parallel to the first and second reference axes 400, 404). While the figures illustrate the tape 200 as being substantially symmetrically disposed over the tape head module 300 along the cross-width dimension 312, the tape 200 may in use sometimes be asymmetrically disposed over the tape head module 300 along the cross-width dimension 312 (e.g., such as when the controller 18 of the tape drive 10 of FIG. 1 laterally positions the tape head module 300 along the width 220 of the tape 200 and parallel to the cross-width 312 of the tape head module 300 to read and/or write data on different tracks of the tape 200).

It will be readily appreciated that many additions and/or deviations may be made from the specific embodiments disclosed in the specification without departing from the spirit and scope of the invention and that the illustrations and discussion herein has only been provided to assist the reader in understanding the various aspects of the present disclosure. Furthermore, one or more various combinations of the above discussed arrangements and embodiments are also envisioned. For instance, while the tape head module 300 of FIGS. 4a-4b illustrates the first, second and third regions 310, 318, 324 as residing entirely or primarily in a respective single plane, some embodiments envision that at least portions of the first, second and third regions 310, 318, 324 (e.g., adjacent first and second edges 368, 372 of tape head module 300) may be tapered, recessed, curved, etc. in first and second opposite directions away from the second reference axis 404 along the width 320 of the tape head module 300.

Embodiments disclosed herein can be implemented as one or more computer program products, i.e., one or more modules of computer program instructions encoded on a computer-readable medium for execution by, or to control the operation of, data processing apparatus (one or more processors). The computer-readable medium can be a machine-readable storage device, a machine-readable storage substrate, a non-volatile memory device, a composition of matter affecting a machine-readable propagated signal, or a combination of one or more of them. In this regard, the host 20, tape drive 10, and the like may encompass one or more apparatuses, devices, and machines for processing data, including by way of example a programmable processor, a computer, or multiple processors or computers. In addition to hardware, the host 20, tape drive 10, and the like may include code that creates an execution environment for the computer program in question, e.g., code that constitutes processor firmware, a protocol stack, a database management system, an operating system, or a combination of one or more of them.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The above described embodiments including the preferred embodiment and the best mode of the invention known to the inventor at the time of filing are given by illustrative examples only.

We claim:

1. A tape head module for performing at least one of reading operations and writing operations on a magnetic tape, comprising:
    a body; and
    an upper surface on the body that is configured to face a magnetic tape traveling at least partially along a first reference axis over the upper surface, wherein the upper surface includes:
        a first region including a plurality of at least one of read elements and write elements that are respectively configured to read data from and write data to the magnetic tape as the magnetic tape travels over and at least partially in contact with the first region along a direction of motion that is collinear with or parallel to the first reference axis; and
        a second region configured to be free of contact with the magnetic tape as the magnetic tape travels over the second region, wherein a distance between a) a second reference axis perpendicular to the first reference axis and b) the second region increases in a direction away from the first reference axis.

2. The tape head module of claim 1, wherein the second region includes at least one radius of curvature.

3. The tape head module of claim 1, wherein the second region resides in a single plane.

4. The tape head module of claim 3, wherein a slope of the second region is not greater than about 25° relative to the second reference axis.

5. The tape head module of claim 3, wherein the first region resides in a single plane different from the single plane within which the second region resides.

6. The tape head module of claim 1, wherein the upper surface further includes a third region configured to be free of contact with the magnetic tape as the magnetic tape travels over the third region, wherein a distance between a) the second reference axis and b) the third region increases in a direction away from the first reference axis.

7. The tape head module of claim 6, wherein the distance between a) the second reference axis and b) the second region increases in a first direction away from the first reference axis, wherein the distance between a) the second reference axis and b) the third region increases in a second direction away from the first reference axis, and wherein the first direction away from the first reference axis is opposite to the second direction away from the first reference axis.

8. The tape head module of claim 7, wherein a distance between a) the first reference axis and b) the first region increases in a direction away from the second reference axis.

9. The tape head module of claim 8, wherein the distance between a) the first reference axis and b) the first region increases in a first direction away from the second reference axis, wherein the distance between a) the first reference axis and b) the first region increases in a second direction away from the second reference axis, and wherein the first direction away from the second reference axis is opposite to the second direction away from the second reference axis.

10. The tape head module of claim 9, wherein a distance between a) a third reference axis through the second region and that is parallel to the first reference axis and b) the second region increases in a direction away from the second reference axis, and wherein a distance between a) a fourth reference axis through the third region and that is parallel to the first reference axis and b) the third region increases in a direction away from the second reference axis.

11. The tape head module of claim 10, wherein the distance between a) the third reference axis and b) the second region increases in the first and second directions away from the second reference axis, and wherein the distance between a) the fourth reference axis and b) the third region increases in the first and second directions away from the second reference axis.

12. A tape drive that includes the tape head module of claim 1.

13. A method, comprising:
    moving a magnetic tape over the upper surface of the tape head module of claim 1, wherein the magnetic tape includes first and second opposite edges, and wherein at least one of the first and second opposite edges is spaced from the second region.

14. The method of claim 13, wherein at least about 20% of a width of the tape between the first and second edges is spaced from the tape head module during the moving.

15. A tape head module for performing at least one of reading operations and writing operations on a magnetic tape, comprising:

a body; and an upper surface on the body that includes a plurality of at least one of read elements and write elements that are respectively configured to read data from and write data to a magnetic tape, wherein the upper surface tapers in first and second opposite directions away from the plurality of the at least one of read elements and write elements, wherein the upper surface tapers in third and fourth opposite directions away from the plurality of the at least one of read elements and write elements, and wherein the first and second directions are perpendicular to the third and fourth directions.

16. The tape head module of claim 15, wherein the upper surface includes a radius of curvature in the first and second opposite directions away from the plurality of read and/or write elements.

17. The tape head module of claim 16, wherein the upper surface includes a radius of curvature in the third and fourth opposite directions away from the plurality of read and/or write elements.

18. A method of operating a tape drive, comprising:

moving tape over a tape head of a tape drive so that a) a first portion of the tape is in contact with a plurality of at least one of read elements and write elements of the tape head and b) a second portion of the tape, disposed along a reference line perpendicular to first and second opposite lateral edges of the tape and that passes through the first portion of the tape, is spaced from the tape head.

19. The method of claim 18, wherein the second portion is adjacent the first edge of the tape, wherein a third portion of the tape along the reference line is spaced from the tape head, and wherein the third portion is adjacent the second edge of the tape.

20. The method of claim 18, wherein at least about 20% of a width of the tape between the first and second edges is spaced from the tape head during the moving.

* * * * *

UNITED STATES PATENT AND TRADEMARK OFFICE
CERTIFICATE OF CORRECTION

PATENT NO.       : 8,958,175 B1  
APPLICATION NO.  : 14/156802  
DATED            : February 17, 2015  
INVENTOR(S)      : Lakshmikumaran et al.

Page 1 of 1

It is certified that error appears in the above-identified patent and that said Letters Patent is hereby corrected as shown below:

In the specification

In column 4, line 43, delete "5a" and insert -- 5a. --, therefor.

In column 5, line 50, delete "the a" and insert -- the --, therefor.

Signed and Sealed this  
Twenty-fourth Day of November, 2015

Michelle K. Lee  
*Director of the United States Patent and Trademark Office*